Sept. 6, 1927.  R. L. WALLACE  1,641,464
MEANS TO PREVENT REVERSE ROTATION OF ROTARY MEMBERS
Filed April 21, 1926
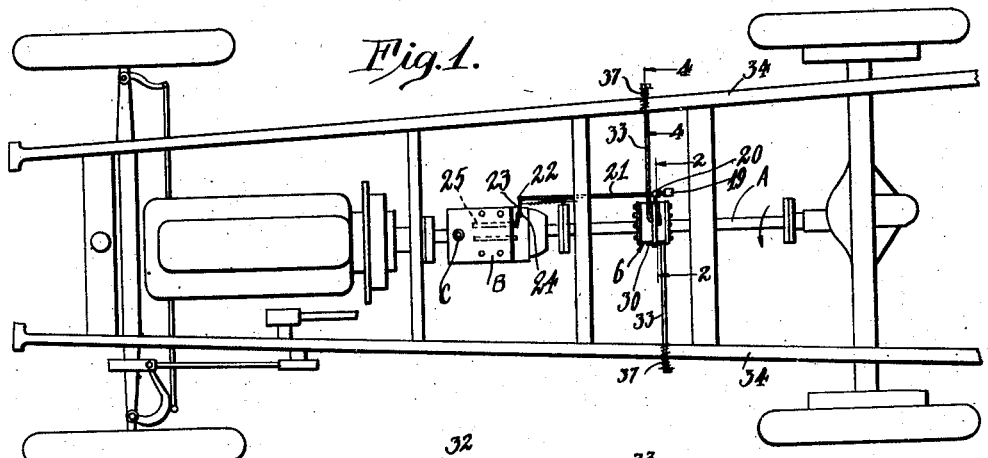
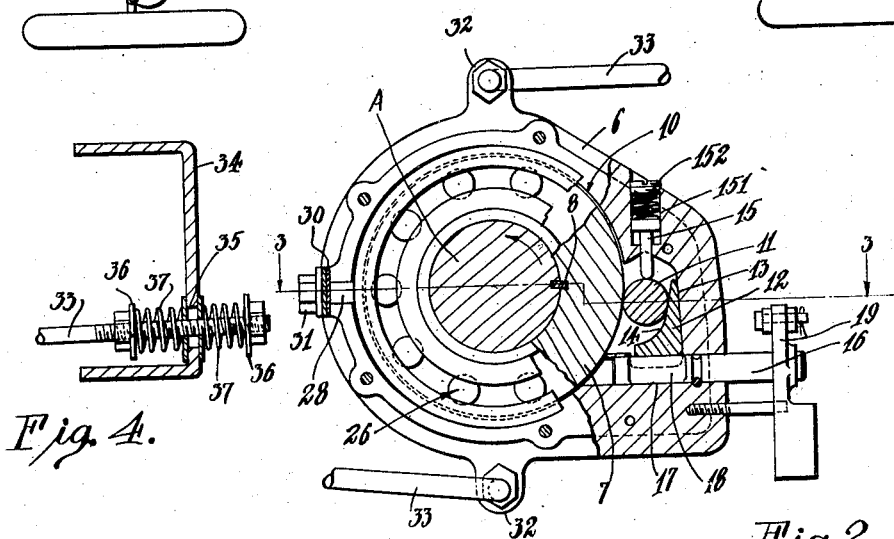
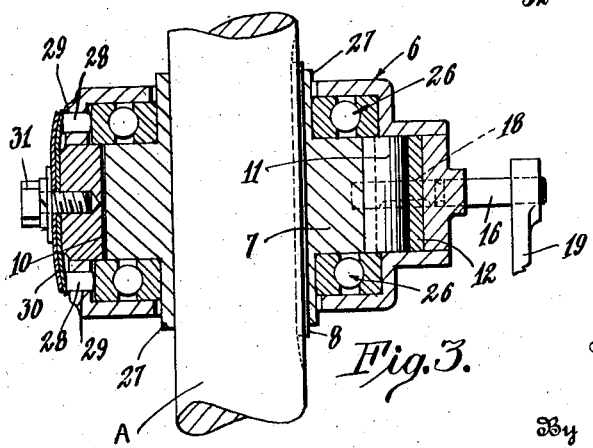
Inventor
Robert Lee Wallace
By Lyon & Lyon
Attorneys Patented Sept. 6, 1927.

1,641,464

UNITED STATES PATENT OFFICE.

ROBERT LEE WALLACE, OF LOS ANGELES, CALIFORNIA.

MEANS TO PREVENT REVERSE ROTATION OF ROTARY MEMBERS.

Application filed April 21, 1926. Serial No. 103,518.

This invention relates to means to prevent reverse rotation of a rotary member, and an important use for it is to hold a rotary part, such as the drive shaft of an automobile, against reverse rotation so that the automobile, when on a grade, will be prevented from rolling backward down the grade in event of the driving power failing and the brakes being off or ineffectual to prevent such backward rolling.

This invention is an improvement on the device patented to Horatio G. Coykendall, November 18, 1924, No. 1,516,081, and an object that distinguishes this invention from said patent is to make provision for preventing deflection of the shaft.

Another object is to make provision for supporting the housing of the device directly upon the shaft.

A further object is to anchor the housing in such manner as to absorb the shock coming upon it when the propeller shaft tends to be rotated in a reverse direction.

Further objects and advantages will appear in the subjoined detailed description.

The accompanying drawings illustrate the invention.

Figure 1 is a plan view of a means embodying the invention, the same being shown in operative position on the chassis of an automobile.

Figure 2 is an enlarged sectional elevation on the line indicated by 2—2, Figure 1, the operating parts being in the positions they occupy when the rotary member is turning in the direction for driving the automobile forward and the dog has been operated to prevent rotation of said rotary member.

Figure 3 is a plan section on the line indicated by 3—3, Figure 2.

Figure 4 is an enlarged fragmental sectional elevation on the line indicated by 4—4, Figure 1.

The construction that is to be described is one that is of advantage to use on an automobile of the type in which the propeller shaft is not enclosed in a housing. Such a propeller shaft is indicated at A in Figure 1 and constitutes a portion of the rotary member which is to be held against reverse rotation. The shaft A passes through a housing 6 and said shaft being of a relatively small diameter, is preferably enlarged by a collar 7 which constitutets a part of the rotary member referred to above and is fixed to the shaft by a key 8, or any other suitable means. The chamber 10 in the housing is slightly larger than the outside diameter of the collar 7 and in said chamber is movably mounted a dog 11 that engages the rotary member 7, said dog, in this instance, being in the form of a roller.

A movable member 12 is provided within the chamber 10 to support the dog 11 in engagement with the rotary member A, said member 12 being releasable so that when it is desired to permit reverse rotation of the rotary member, the supporting member 12 may be lowered to permit the dog to drop.

The member 12 is preferably a wedge-shaped block having its wider end pointing downwardly. The outer face of the block 12 preferably bears against the upwardly and inwardly slanting face 13 of the wall of the chamber 10 so that if the block 12 is moved upwardly, said block is wedged toward the rotary member A, as in Figure 2, thus narrowing the space in which the dog 11 is positioned. This forces the dog 11 inwardly into engagement with the rotary member 7, which then is free to rotate forward in the direction of the arrow in Figure 2, but which at that time cannot turn in a reverse direction, because of the frictional hold of the dog 11 upon the rotary member.

The wedging effect of the block 12 upon the dog 11 is secured in two ways, for, not only is the face 13 aslant upwardly and inwardly but the inner face 14 of the block 12 is aslant upwardly and outwardly. In the elevated position of the dog 11, said dog has a three-point bearing as it bears against one side of the rotary member 7, against the upper portion of the face 14, and against a yieldingly held member 15 shiftably mounted in a chamber 151 in the housing 6. A spring 152 in the chamber 151 above the member 15 yieldingly holds the said member 15, which is in the form of a plunger, against the dog 11, thus tending to move the dog 11 into the retracted position when the block 12 is lowered.

Any suitable means may be provided for operating the block 12 from the lowered position to the elevated position shown in Figure 2, and such means comprises, in this instance, a cam shaft 16 inserted in a bearing 17 in the housing 6, said shaft extending across the lower portion of the chamber 10. The shaft 16 is provided with a cam 18 on that portion that extends across the lower part of the chamber 10 so that, when the shaft 16 is turned to the position shown in Figure 2, the high point of the cam will bear against the lower end of the block 12 and hold said block in its elevated position. When the shaft 16 is turned from the position shown in Figure 2, the low point of the cam is uppermost, thus permitting the block 12 to be pushed downwardly by the roller 11 which in turn is positively actuated into its retracted position by expansion of the spring 152. The cam 18, in this instance, is an eccentric and the shaft 16 is turned by an arm 19 that in turn is pivoted at 20 to one end of a link 21, the other end of which is pivoted at 22 to a lever 23. The lever 23 is pivotally mounted at 24 on the transmission case B. One arm of the lever 23 lies in the path of movement of one of the gear shift rods, indicated at 25 in Figure 1, said rod being the one that controls the low speed forward and reverse positions of the transmission gears, not shown. The construction of change-speed mechanism for automobiles is well understood by those skilled in the automobile art and, therefore, it suffices to state that when the gear shift lever, indicated at C, is moved into its reverse position, it thrusts the rod 25 rearwardly thus actuating the lever 23 which in turn causes the cam 18 to be turned with its low point uppermost, permitting retraction of the dog 11.

It has been stated above that the chamber 10 is somewhat larger than the diameter of the member 7, and thus permits relative transverse motion between the housing and the member 7. Thus, when the dog 11 is forced into engagement with the member 7, there is a reaction of the dog 11 against the block 12 which forces the housing to the right in Figure 2 so as to cause the wall of the chamber 10 on the left side to forcibly engage the rotary member 7 at that side. This avoids deflection of the shaft A, and at the same time produces an increased frictional resistance against reverse rotation of the member 7.

Means is provided to yieldingly hold the housing 6 spaced from the member 7 and such means, in this instance, is constructed as follows: Within the housing 6, at opposite ends of the member 7, are ball bearings 26 which function as journals for the member 7, the reduced end portions 27 of the member 7 extending through said bearings. At those sides of the bearings 26 that are substantially diametrically opposite to the dog 11, said bearings are engaged by studs 28 which project through holes 29 in the housing 6. The outer ends of the studs 28 are engaged by a spring 30, secured by a screw 31, or other suitable fastening device, to the housing 6. The bearings 26 are held against movement to the right in Fig. 3 by rigidity of the rotary member A and, accordingly, the housing 6 will be held by the spring 30 to the left in Fig. 3 when the dog 11 is in its retracted position.

As the housing 6 would tend to rotate with the shaft A, it is necessary to anchor said housing and for this purpose, said housing is provided at diametrically opposite points with ears 32, which pivotally connect with rods 33. The rods 33 are connected to a suitable stationary part of the automobile and, in this instance, said part is the chassis frame 34. The rods 33 are yieldingly connected with the frame 34 and to accomplish this, each of said rods extends through a hole 35 in the frame 34 and is provided on opposite sides of the frame 34 with shoulders 36, and surrounding each rod between the shoulders 36 and the frame is a coil spring 37. The springs 37 operate to yieldingly hold the rod 33 against endwise movement either way.

The operation of the invention is as follows:

Assuming that the automobile is traveling forward up a grade and that the propeller shaft A is rotating in the direction of the arrow in Figure 2, the cam 18 and other operating parts will normally be in the positions shown in Figure 2, thus permitting free rotation of the propeller shaft in the direction of the arrow. Let it now be assumed that, for some reason or other, the automobile comes to a stop on the grade and begins to back down the grade, thus reversing the rotation of the propeller shaft, thereby cramping the dog 11 between the block 12 and member 7 and causing the housing 6 to shift to the right in Fig. 3 against the pressure of the spring 30 and one of the springs 37 on each rod 33, so as to forcibly engage the housing with the left side of the member 7, thus compressing said springs. The member 7 being thus locked to the housing 6, the housing 6 will tend to rotate clockwise in Fig. 2, thus pushing the rods 33 against the pressure of the inner springs 37, which function to absorb the shock. The reaction of the block 12 upon the housing 6 would tend to deflect the member 7 and shaft A to the left in Figure 2, but the thrust of the block 12 against the face 13 causes the housing 6 to shift to the right in Figure 2 and the wall of the chamber 10 engages that side of the member 7 that is substantially diametrically opposite to the side of said member 7 that is engaged by the dog 11. Thus the member 7 is gripped on opposite sides and the gripping means is self-centering so as to avoid deflecting or bending the shaft either to the right or left. This gripping of the member 7 prevents reverse rotation of the propeller shaft but at any time said shaft is free to turn forward in the direction of the arrow in Figure 2 as soon as power is applied to thus turn said shaft, and, when such power is applied, the pressure of the member 7 against the dog 11 is relieved, thus relieving the thrust of the block 12 against the housing, permitting said housing to be retracted to the left in Figure 3 by expansion of the spring 30 and the springs 37 previously compressed. As soon as the shaft A begins to turn forward, the housing 6 will be turned to normal position by expansion of the inner springs 37.

Now, assuming, for example, that the operating parts are in the positions shown in Figure 2 and that it is desired to permit the automobile to back down the grade, or, if the grade is on a level, to permit the automobile to be driven rearwardly by application of the power of the engine, the gear shift lever C will be operated to put the transmission gears in reverse, thus shifting the rod 25 rearwardly to operate the lever 23 and rotate the cam 18 into a position that will permit the block 12 to lower, thus allowing the dog 11 to drop so as to free the member 7 from being held by the dog, whereupon the springs 30, 37 will function to retract the housing to the left in Figure 3 and thus the rotary member 7 will be free to turn clockwise in Fig. 2.

The chief purpose of providing the springs 37 is to afford a floating anchorage for the housing and the spring 30 is provided more especially for the purpose of holding the housing spaced from the rotary member, though said spring 30 also prevents looseness of the outer members of the bearings 26.

I claim:

1. A means of the character described comprising a rotary member, a bearing on the rotary member, a housing supported on the bearing and shiftable sideways on said bearing, a dog in the housing to engage the rotary member, means in the housing operable against the dog and one side of the housing to move the housing into position to engage the opposite side of the housing with the rotary member, and means yieldingly holding the housing against movement to said position.

2. A means of the character described comprising a rotary member, a bearing on the rotary member, a housing supported on the bearing and shiftable sideways on said bearing, a dog in the housing to engage the rotary member, means in the housing operable against the dog and one side of the housing to move the housing into position to engage the opposite side of the housing with the rotary member, means holding the housing against rotation, and means engaging the bearing and yieldingly resisting movement of the housing to said position.

3. A means of the character described comprising a rotary member, a bearing on the rotary member, a housing supported on the bearing and shiftable sideways on said bearing, a dog in the housing to engage the rotary member, means in the housing operable against the dog and one side of the housing to move the housing into position to engage the opposite side of the housing with the rotary member, and means yieldingly holding the housing against rotation and against movement to said position.

4. A means of the character described comprising a rotary member, a bearing on the rotary member, a housing supported on the bearing and shiftable sideways on said bearing, a dog in the housing to engage the rotary member, means in the housing operable against the dog and one side of the housing to move the housing into position to engage the opposite side of the housing with the rotary member, means yieldingly holding the housing against rotation, and means engaging the bearing and yieldingly resisting movement of the housing to said position.

5. A means of the character described comprising a rotary member, a bearing on the rotary member, a housing supported on the bearing and shiftable sideways on said bearing, a dog in the housing to engage the rotary member, means in the housing wedgeable between the dog and one side of the housing to move the housing into position to engage the opposite side of the housing with the rotary member, and means yieldingly holding the housing against movement to said position.

6. A means of the character described comprising a rotary member, a bearing on the rotary member, a housing supported on the bearing and shiftable sideways on said bearing, a dog in the housing to engage the rotary member, means in the housing wedgeable between the dog and one side of the housing to move the housing into position to engage the opposite side of the housing with the rotary member, means holding the housing against rotation, and means engaging the bearing and yieldingly resisting movement of the housing to said position.

7. A means of the character described comprising a rotary member, a bearing on the rotary member, a housing supported on the bearing and shiftable sideways on said bearing, a dog in the housing to engage the rotary member, means in the housing wedgeable between the dog and one side of the housing to move the housing into position to engage the opposite side of the housing with the rotary member, and means yieldingly holding the housing against rotation and against movement to said position.

8. A means of the character described comprising a rotary member, a bearing on the rotary member, a housing supported on the bearing and shiftable sideways on said bearing, a dog in the housing to engage the rotary member, means in the housing wedgeable between the dog and one side of the housing to move the housing into position to engage the opposite side of the housing with the rotary member, means yieldingly holding the housing against rotation, and means engaging the bearing and yieldingly resisting movement of the housing to said position.

Signed at Los Angeles, California, this 12 day of April, 1926.

ROBERT LEE WALLACE.